(12) United States Patent
Mahapatra et al.

(10) Patent No.: US 10,713,716 B2
(45) Date of Patent: Jul. 14, 2020

(54) VERIFICATION MODEL USING NEURAL NETWORKS

(71) Applicant: Airbnb, Inc., San Francisco, CA (US)

(72) Inventors: Chirag Mahapatra, San Francisco, CA (US); Kedar Bellare, San Jose, CA (US)

(73) Assignee: Airbnb, Inc., San Francisco, CA (US)

(*) Notice: Subject to any disclaimer, the term of this patent is extended or adjusted under 35 U.S.C. 154(b) by 55 days.

(21) Appl. No.: 16/043,752

(22) Filed: Jul. 24, 2018

(65) Prior Publication Data

US 2019/0043127 A1   Feb. 7, 2019

Related U.S. Application Data

(60) Provisional application No. 62/541,132, filed on Aug. 4, 2017.

(51) Int. Cl.
*G06Q 40/02* (2012.01)
*G06N 3/08* (2006.01)
(Continued)

(52) U.S. Cl.
CPC ....... *G06Q 40/025* (2013.01); *G06F 16/9535* (2019.01); *G06N 3/0445* (2013.01);
(Continued)

(58) Field of Classification Search
None
See application file for complete search history.

(56) References Cited

U.S. PATENT DOCUMENTS 7,451,095 B1 * 11/2008 Bradley ............... G06Q 10/10
                                                    705/35
8,401,868 B1 *  3/2013 Bradley et al. ....... G06O 10/00
                                                    705/1.1
(Continued)

FOREIGN PATENT DOCUMENTS

EP        2838065 A1 *  2/2015  ............ G06Q 40/00
WO     2019027763       2/2019

OTHER PUBLICATIONS

Luoxiao et al., "Prediction of Salary in UK," 2013, University of California, San Diego (Year: 2013).*
(Continued)

*Primary Examiner* — Abhishek Vyas
*Assistant Examiner* — Dario Bianco
(74) *Attorney, Agent, or Firm* — Schwegman Lundberg & Woessner, P.A.

(57) ABSTRACT

Systems and methods are provided for generating a search query based on received user data to perform an internet search using the search query. The systems and methods further extract data from internet search results from the internet search using the search query, generate internet search income records from the extracted data, generate income records from one or more databases comprising income records, and combine the internet search income records and the generated income records from the one or more databases to form combined income record results. The systems and methods further identify candidate income records from the combined income record results, extract features from each candidate income record for generating an income prediction, and generate the income prediction using a machine learning model to predict an income, based on the extracted features from the candidate income records.

17 Claims, 7 Drawing Sheets

(51) Int. Cl.
G06Q 10/10 (2012.01)
G06F 16/9535 (2019.01)
G06N 20/00 (2019.01)
G06N 3/04 (2006.01)

(52) U.S. Cl.
CPC .............. *G06N 3/08* (2013.01); *G06N 20/00* (2019.01); *G06Q 10/105* (2013.01)

(56) References Cited

U.S. PATENT DOCUMENTS

2007/0055621 A1    3/2007   Tischler et al.
2013/0339220 A1*  12/2013   Kremen .................. G06Q 40/06
                                                                    705/38

OTHER PUBLICATIONS

Luoxiao Li et al., "Prediction of Salary in UK," 2013, University of California, San Diego (Year: 2013).*
Preoṭiuc-Pietro et al.; "Studying User Income through Language, Behaviour and Affect in Social Media"; Sep. 15, 2015; PLOS ONE (Year: 2015).*
"International Application Serial No. PCT US2018 043690, International Search Report dated Dec. 27, 2018", 2 pgs.
"International Application Serial No. PCT US2018 043690, Written Opinion dated Dec. 27, 2018", 4 pgs.
Shunina, Yu S, "Bank clients solvency forecasting based on machine learning methods and markov chains", Software and Systems, No. 2 (114), [Online] Retrieved from the internet:https: cyberleninka.ru article n prognozirovanie-platezhesposobnosti-klientov-banka-na-osnove-metodov-mashinnogo-obucheniva-i-markovskih-tsepey, (2016), 105-112.
"Distributed Representations ofWords and Phrases and their Compositionality", Advances in neural information processing systems •, (Oct. 2013), 10 pgs.
"Glassdoor", [Online]. [Accessed Jul. 16, 2018]. Retrieved from the Internet: <URL: https://www.glassdoor.com/index.htm>, 7 pgs.
"PayScale", [Online]. [Accessed Jul. 16, 2018]. Retrieved from the Internet: <URL: https://www.payscale.com/>, 2 pgs.
Chen, Tianqi, et al., "XGBoost: A Scalable Tree Boosting System", http://arxiv.org/abs/1603.02754v3, 10 pgs.
Jackman, Shaun, et al., "Predicting Job Salaries from Text Descriptions", doi:http://dx.doi.org/10.14288/1.0075767, (Apr. 16, 2013), 6 pgs.
Kibekbaev, Azamat, et al., "Benchmarking Regression Algorithms for Income Prediction Modeling", 2015 International Conference on Computational Science and Computational Intelligence, (2015), 180-185.
Kohavi, Ron, "Scaling up the Accuracy of Naive-Bayes Classifiers: a Decision-Tree Hybrid", KDD-96 Proceedings, (1996), 202-207.
Kohavi, Ronny, et al., "UCI Adult Data Set", UCI Meachine Learning Repository, (Accessed Jul. 13, 2018), 5 pgs.
Lazar, Alina, "Income Prediction via Support Vector Machine", International Conference on Machine Learning and Applications, 2004, doi:10.1109/ICMLA.2004.1383506, 7 pgs.
Li, Luoxiao, et al., "Prediction of Salary in UK", 5 pgs.
Preotiuc-Pietro, Daniel, et al., "Studying User Income through Language, Behaviour and Affect in Social Media", PLOS ONE | DOI:10.1371/journal.pone.0138717, (Sep. 22, 2015Sep. 22, 2015), 17 pgs.

* cited by examiner

VERIFICATION MODEL USING NEURAL NETWORKS

PRIORITY

This application claims the benefit of priority to U.S. Provisional Patent Application Ser. No. 62/541,132, filed on Aug. 4, 2017, which is incorporated by reference herein in its entirety.

BACKGROUND

Income verification is the problem of validating a person's stated income given basic identity information such as the person's name, location, job title, and employer. It is widely used in the context of mortgage lending, rental applications, and other financial risk models. The current processes surrounding verification, however, involve significant human effort and document gathering, which can be both time-consuming and expensive.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
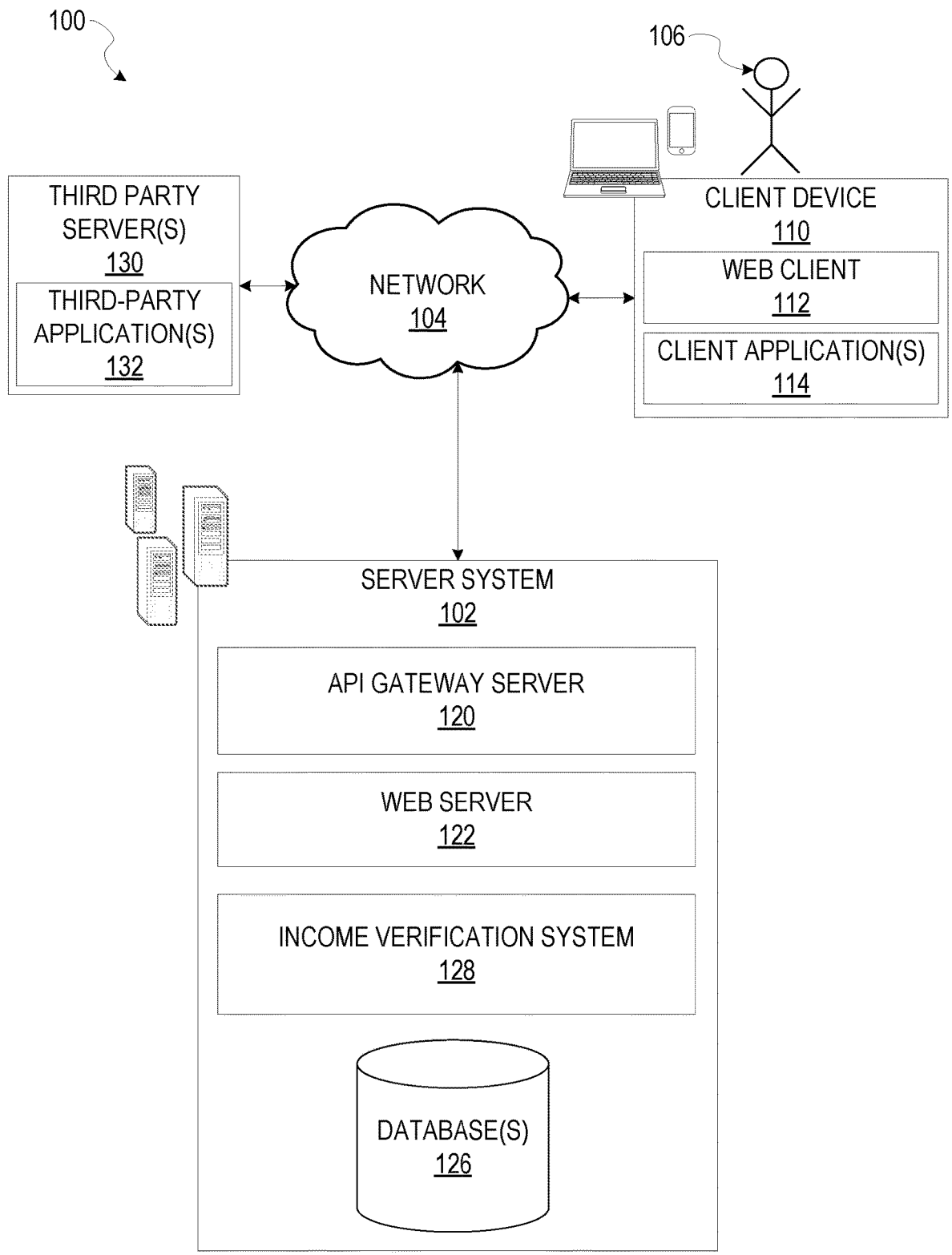
FIG. 1 is a block diagram illustrating a networked system, according to some example embodiments.

Example systems and methods described herein relate to income verification utilizing deep neural networks. As explained above by way of example, income verification includes the challenge of validating a person's stated income given basic identity information such as name, location, job title, and employer. It is widely used in the context of mortgage lending, rental applications, and other financial risk models. The current processes surrounding verification, however, involve significant human effort and document gathering, which can be both time-consuming and expensive.

Moreover, there has been a growing number of online sources collecting and disseminating income information (e.g., Payscale, Glassdoor, or the like). The main reason for this push is the need for pay transparency and accountability from both private and public institutions. In some cases, such as government sources, estimates of the salary and bonus data are available. Other sources collect compensation details from individuals willing to report such information and expose only anonymized ranges for individual income components. Example embodiments include a system to exploit such resources to improve income verification.

Example embodiments describe a novel model for verifying an individual's income given very limited identity information typically available in loan applications. This model is a combination of a deep neural network and hand-engineered features. The hand-engineered features are based upon matching the input information against income records extracted automatically from various publicly available online sources (e.g., H-1B filings, government employee salaries, etc.). Experiments were conducted on two data sets, one simulated from H-1B records and the other from a real-world data set of peer-to-peer (P2P) loan applications obtained from the world's largest P2P lending platform. Experiment results show a significant reduction in error of 3-6% relative to several strong baselines. Ablation studies were also performed to demonstrate that a combined model can be used to achieve state-of-the-art performance on this task.

One technical problem addressed by embodiments described herein is the problem of income verification. For example, given a person's basic identity (e.g., name, date of birth), current employment information (job title, company, location), and stated income, example embodiments can accurately validate the income of the given individual within a certain threshold. In one embodiment, income is defined as a sum of earnings, such as base salary and bonus, in a year. In one embodiment, rent, stock awards, interest payments, dividend payments, and other forms of income are not included. It is to be understood, however, that other forms of income can be included in other embodiments. Moreover, example embodiments are described using the example of loan applications. It is to be understood that example embodiments may be used in other use case scenarios for income verification.

One of the foremost use cases of income verification is to distinguish between creditworthy and fraudulent users during loan applications. Several of the recent payday loan and peer-to-peer loan companies provide instant pre-approved loans, powered by models behind the scenes that can accurately assess the risk involved with an application. An individual's validated income is an important feature of these risk models. Banks and lending institutions need to make these checks in a cost-effective and time-efficient manner.

A main component of an income verification system is income prediction from a given input identity. Example embodiments leverage the power of publicly available data sources on the internet (e.g., web) to solve the prediction problem. The terms "internet," "web," and "public web" are used interchangeably herein. Using public sources and the public web comes with numerous technical challenges.

One challenge is how to search, extract, and match data from structured and unstructured sources of web documents and database records. Example embodiments build queries to get a candidate set of web documents and database records, extract the data from structured and unstructured sources, and filter the sources to only those which have the closest match to the input identity.

Another challenge is partial information input by a user and on the web. One example is acronyms and alternate names of companies. For example, "United States Postal Service" can be represented as "USPS," "U.S.P.S.," and the like. Example embodiments provide methods to identify that these are all the same entity.

Another technical challenge is erroneous data on the web, because not all sources on the web are accurate. For example, some web sources misrepresent salary information or are outdated.

Example embodiments describe a robust system that addresses some or all of these issues. First, an online search solution uses algorithms to leverage head-heavy search engines to surface salary content on various domains. For example, surfaced content includes domains such as https://transparentcalifornia.com/, https://www.fedsdatacenter.com/usps-pay-rates/, and the like. Example embodiments further include offline crawls of a large number of these domains and direct searches of internal databases. Each of these domains poses a different extraction challenge. For example, in some cases content needs to be extracted from unstructured text, while in other cases the system described herein can directly use customized wrappers.

Second, to address the issue of partial information (either in the input or on the web), example embodiments "expand" the scope of identity. For example, example embodiments can infer the industry from the company, and the experience level from the job title and date of birth if present, and then generalize a search to the given position and industry.

Finally, to address the issue of possibly incorrect information on the web, example embodiments include building a model that aggregates salary ranges across several domains, and then computes one unified range by factoring in (a) frequencies of occurrence, (b) trustworthiness of sources, and (c) strength of identity match between the input and each source.

Embodiments described herein may be utilized in a wide variety of applications. In one example, example embodiments may be utilized in an online marketplace. FIG. 1 is a block diagram illustrating a networked system 100, according to some example embodiments. The system 100 includes one or more client devices such as a client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, or any other communication device that a user may utilize to access the networked system 100. In some embodiments, the client device 110 comprises a display module (not shown) to display information (e.g., in the form of user interfaces). In further embodiments, the client device 110 comprises one or more of touch screens, accelerometers, gyroscopes, cameras, microphones, Global Positioning System (GPS) devices, and so forth. The client device 110 may be a device of a user that is used to request and receive reservation information, accommodation information, loan information, income verification, and so forth.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., voice, touch screen input, alphanumeric input, etc.) to the client device 110 and the input may be communicated to other entities in the system 100 (e.g., third-party servers 130, server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 further includes a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WIFI network, a WiMax network, another type of network, or a combination of two or more such networks.

The client device 110 accesses the various data and applications provided by other entities in the system 100 via a web client 112 (e.g., a browser, such as the Internet Explorer® browser developed by Microsoft® Corporation of Redmond, Wash. State) or one or more client applications 114. The client device 110 includes one or more client applications 114 (also referred to as "apps") such as, but not limited to, a web browser, a messaging application, an electronic mail (email) application, an e-commerce site application, a mapping or location application, a reservation application, a loan or financial application, and the like.

In some embodiments, one or more client applications 114 are be included in a given client device 110 and configured to locally provide the user interface and at least some of the functionalities, with the client application 114 configured to communicate with other entities in the system 100 (e.g., the third-party servers 130, server system 102, etc.), on an as-needed basis, for data and/or processing capabilities not locally available (e.g., to access reservation information or listing information, to request data, to authenticate a user 106, to verify a method of payment, to verify income, etc.). Conversely, one or more client applications 114 may not be included in the client device 110, and then the client device 110 may use its web browser to access the one or more applications hosted on other entities in the system 100 (e.g., the third-party servers 130, server system 102, etc.).

The system 100 further includes one or more third-party servers 130. The one or more third-party servers 130 includes one or more third-party application(s) 132. The one or more third-party application(s) 132, executing on the third-party server(s) 130, interact with the server system 102 via an application programming interface (API) gateway server 120 via a programmatic interface provided by the API gateway server 120. For example, one or more of the third-party applications 132 requests and utilizes information from the server system 102 via the API gateway server 120 to support one or more features or functions on a website hosted by a third-party or an application hosted by the third-party. The third-party website or application 132, for example, provide various functionality that is supported by relevant functionality and data in the server system 102.

The server system 102 provides server-side functionality via the network 104 (e.g., the internet or a wide area network (WAN)) to one or more third-party servers 130 and/or one or more client devices 110. The server system 102 may be a cloud computing environment, according to some example embodiments. The server system 102, and any servers associated with the server system 102, may be associated with a cloud-based application, in one example embodiment.

The server system 102 includes an application programming interface (API) gateway server 120, a web server 122, and an income verification system 128, which may be communicatively coupled with one or more databases 126 or other forms of data stores.

The one or more databases 126 may be one or more storage devices that store data related to the income verification system 128 and other systems or data. The one or more databases 126 may further store information related to third-party servers 130, third-party applications 132, client devices 110, client applications 114, users 106, and so forth. The one or more databases 126 may be implemented using any suitable database management system such as MySQL, PostgreSQL, Microsoft SQL Server, Oracle, SAP, IBM DB2, or the like. The one or more databases 126 may include cloud-based storage, in some embodiments.

Figure 2:
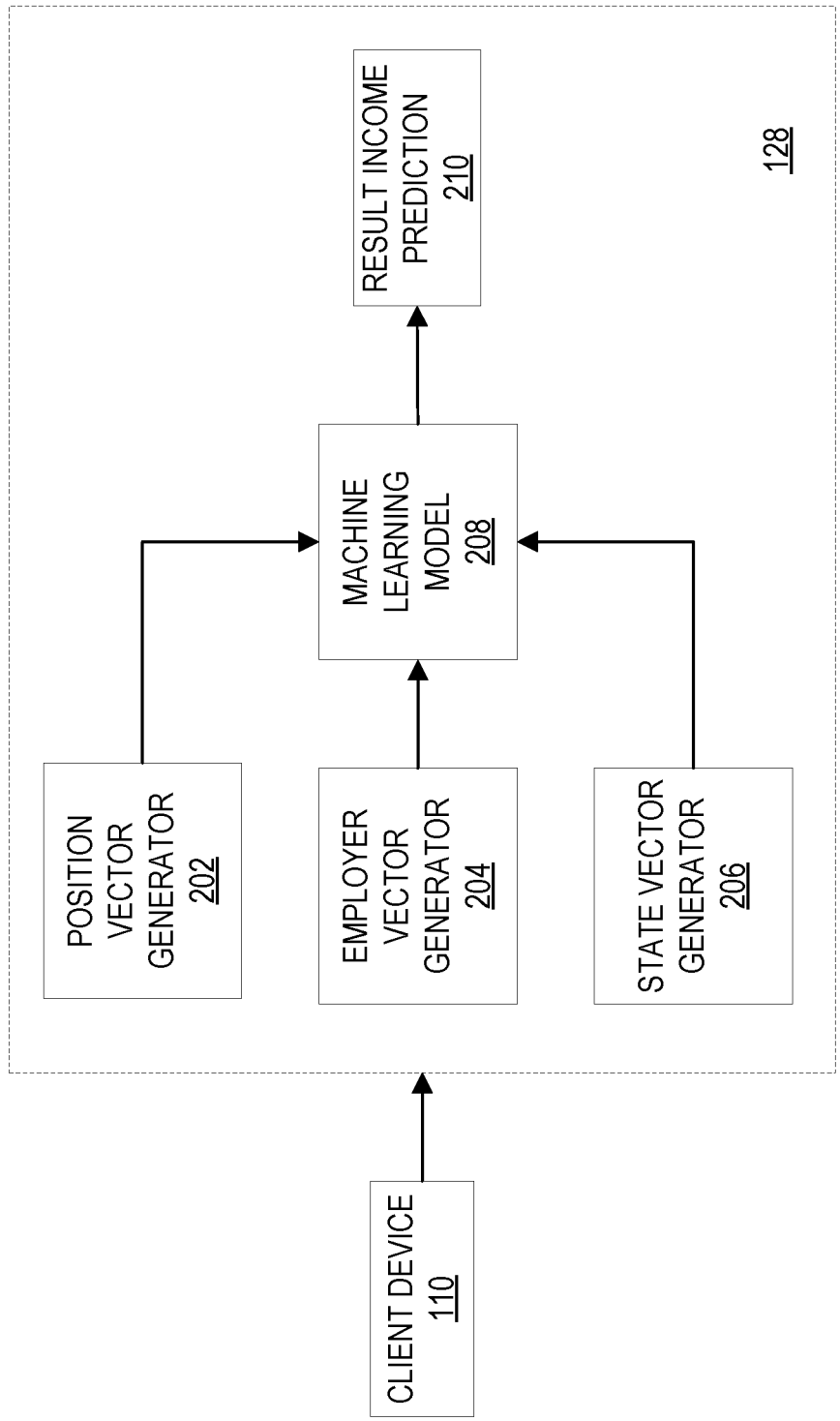
FIG. 2 is a block diagram illustrating one example income verification system, according to some example embodiments.

The income verification system 128 provides functionality for income verification. FIG. 2 is a block diagram illustrating one example of an income verification system 128, according to some example embodiments.

In this example, the income verification system 128 receives user input data from a client device 110. In other examples, the income verification system 128 may receive user input data via a third-party server 130, or another computing system (e.g., in batch or individually). User data includes information such as a user name, a user position (e.g., data scientist, teacher, engineer), a user salary, a user date of birth, an employer name, an employer address, a user address, other geographic information, and so forth. For example, user data may include:

| Attribute | Example |
|---|---|
| Name | Barack H Obama |
| Address | Washington DC |
| Date of Birth | Aug. 4, 1961 |
| Employer | United States Government |
| Position | President |
| Stated Income | $400,000 |

The example input data in the above table is one example of user data that may be input into the system. In other examples, user data may include less data or additional data. The rows of the above input include personally identifiable information (e.g., name, address, date of birth), employment information (e.g., employer, position), and the individual's stated income (e.g., stated income). As explained above, a goal of example embodiments is to verify that the stated income is accurate. There are some problems with input information. For example, some of the information may be missing or incomplete. For instance, the second row in the table has an incomplete address. Accordingly, the input data is canonicalized in some embodiments, as described in further detail below.

Moreover, employment and income information may be noisy or inaccurate. In some example embodiments, it is assumed that the employment information is correct. In practice, it has been observed that a very small percentage (e.g., roughly 1%) of people provide incorrect employment details, but nearly 25% state a significantly higher income than their actual verifiable income.

In one example embodiment, the income verification system 128 does not use sensitive information such as a social security number, email, phone number, or experience level for verifying income. This approach is broadly applicable since it can be applied in scenarios where users are averse to giving out such private information.

The income verification system 128 determines a user position from the user data, and a position vector generator 202 generates a position embedding vector based on the user data. For example, the user position is input into the trained position vector generator 202 and the trained position vector generator generates a position embedding vector from the user position.

In one example, the position embedding vector is trained using distinct positions (e.g., 500,000 distinct positions) obtained from a large public data set that contains employer, position, location and income each of which can be noisy/inaccurate. In one example, a method to generate word embedding (e.g., Word2Vec) is used to learn a 300-dimensional vector for each word in the position. Given the word vectors a vector is generated for the position using a recurrent neural network (e.g., Long Short Term Memory (LSTM)). The parameters of the LSTM and word vectors are then tuned to predict incomes on the large data set.

The income verification system 128 determines an employer name and employer information from the user data, and an employer vector generator 204 generates an employer embedding vector. For example, the employer name and information is input into the trained employer vector generator 204 and the trained employer vector generator generates an employer embedding vector from the user position.

In one example, the employer vector is generated using distinct employers (e.g., 100,000 distinct employers) obtained from a large public data set that contains employer, position, location and income each of which can be noisy/inaccurate. In one example, a method to generate word embedding (e.g., Word2Vec) is used to learn a 300-dimensional vector for each word in the employer. Given the word vectors a vector is generated for the position using a recurrent neural network (e.g., Long Short Term Memory (LSTM)). The parameters of the LSTM and word vectors are then tuned to predict incomes on the large data set.

The income verification system 128 determines a state name from the user data, and a state vector generator 206 generates a state vector. For example, the state name is input into the trained state vector generator 206 and the trained state vector generator generates a state embedding vector from the user position.

In one example, the state vector is a one-hot vector. For example, the income verification system 128 may have 50 dimensions corresponding to the number of U.S. states and a 1 in the dimension for the state that was present and a 0 for all other dimensions.

The income verification system 128 inputs the generated position vector, employer vector, and state vector into a trained machine learning model 208 for an income prediction for the user. In one example, the machine learning model 208 is a feedforward neural network, but it is to be understood that other machine learning models can be used (e.g., logistic regression, support vector machines, random forest, gradient boosting trees, etc.) in other examples.

In one example, a dataset for the machine learning model 208 is created using publicly available salary data. One example of publicly available salary data includes the H-1B salary database that includes data from the U.S. Department of Labor such as employer, job title, salary, location, and so forth for numerous jobs in the U.S. Other data may also be used for the dataset for the machine learning model 208, such as salary data from peer-to-peer lending companies, salary information from conventional loan companies, and so forth.

In one example, the income verification system 128 uses the salary data from publicly available sources or other sources to build a dataset for training and testing the machine learning model 208. For example, the income verification system 128 may ingest a CSV file or Excel file, or otherwise receive and store the data. The income verification system 128 stores the data in one or more databases (e.g., the database(s) 126).

In one example, word embeddings are created by training the machine learning model 208 on the job title and employer using Mikolov's Skip-gram model. The job title is further trained using position and stated income data publicly available (e.g., H-1B data stored in the database(s) 126, as explained above). The tuning is done using a Long Short-Term Memory (LSTM) module, in one example. The job title and employer word embeddings are concatenated with a one-hot encoded vector of the user's state.

In one example, the embedding dimensions are 300 each, while the state encoding has a dimension of 50. This 650-dimension vector forms the input to a feedforward neural network, in one example. In one example, the feedforward neural network consists of 1 hidden layer of size 200. The loss measure is Mean Absolute Error. The machine learning model 208 does not use the wide range of sources available on the web (as used by the machine learning model 326 in FIG. 3, explained below).

The machine learning model 208 outputs a result income prediction 210. For example, from user data (e.g., user name, user position, and employer information) for a particular user and based on data from verified sources (e.g., publicly or privately available salary data), the machine learning model 208 can output an income prediction 210 for the user. The income prediction 210 is a positive number indicating the salary (e.g., 40,000 or 150,000) since the machine learning model 208 is trained to predict incomes based on the large data set. The income prediction 210 can then be used to verify the user input income. In one example, from the income prediction 210 an upper threshold (e.g., predicted income*1.15) can be created. If the stated income is lower than the upper threshold, then the user's income may be deemed verified.

As explained below, this income prediction 210 may be fed directly into the machine learning model 402 of FIG. 4. The machine learning model 402 combines the two income predictions (e.g., 210 and 328) to computer a final income prediction which can be compared to the stated income input by the user.

In one example, a ratio of the final_predicted income (e.g., income prediction 210, 328, or 404) to stated_income (e.g., user input salary) is computed. A salary input by a user (e.g., stated_income) may be determined accurate if it is above a predetermined threshold (e.g., 0.9). The predetermined threshold may vary depending on how accurate the requestor needs the verification to be. For example, a lender of a large amount of money may have a higher threshold in verifying income than a lender of a small amount of money, or than another entity using income verification for other use cases where it just needs to know whether or not the user income is in a general range of income.

In another example, a range of verification may be determined using the income prediction. For example, a low confidence range includes an income prediction below a predetermined value (e.g., ratio 0.6) and indicates that the user input salary is not likely accurate, a medium confidence range includes an income prediction between a predetermined range of values (e.g., ratios 0.6 and 0.9) and indicates that the user input salary is likely within a spread for the salary, and a high confidence range may include an income prediction of a ratio of 0.9 or higher, indicating that the user input salary is fairly accurate. In this way a requestor can determine whether or not the income is verified for the entity's particular situation. In one example, the ratio may be anywhere close to 0 (e.g., a predicted income is lower than stated) or 2 (e.g., the predicted income is twice as much as stated).

Figure 3:
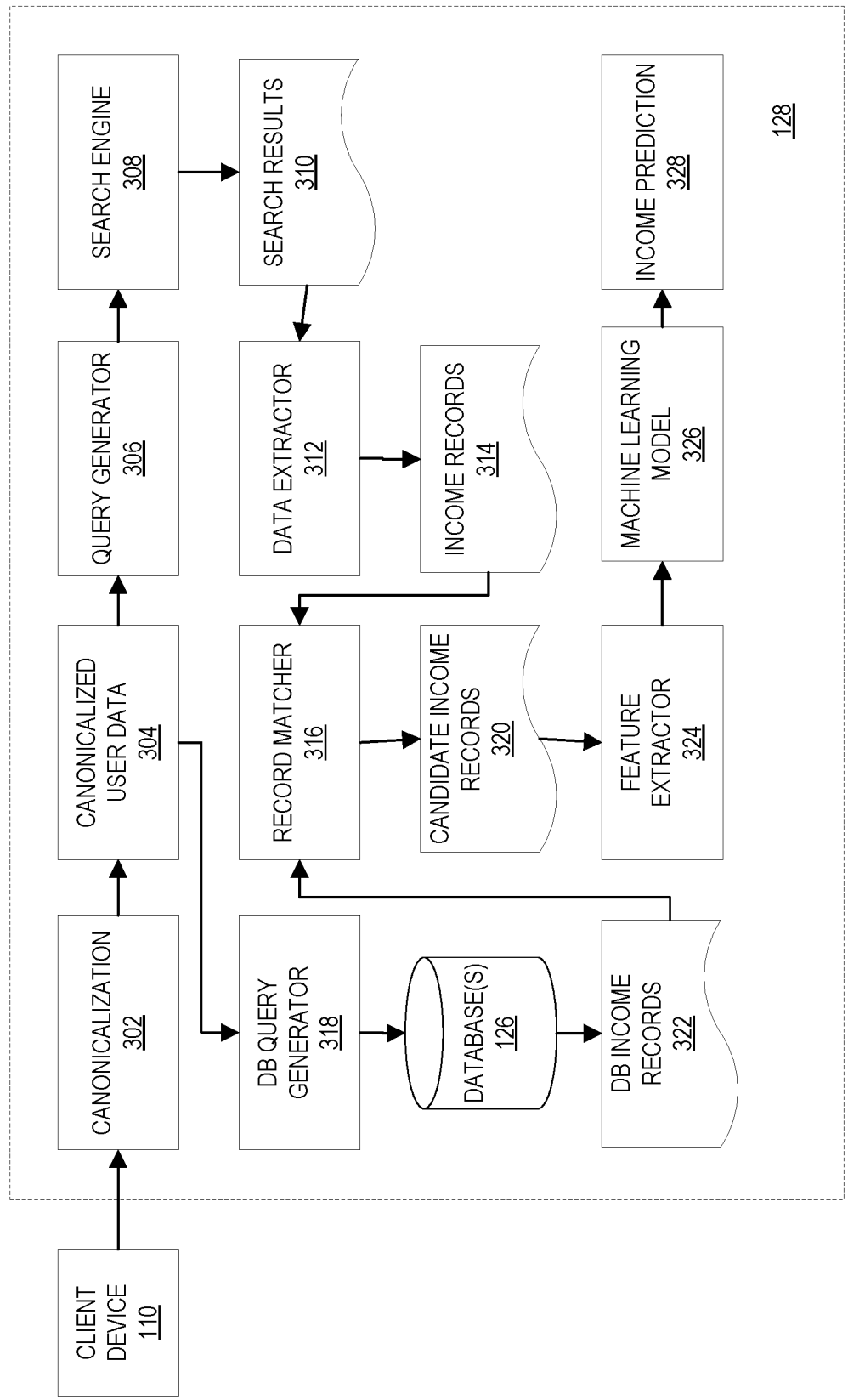
FIG. 3 is a block diagram illustrating another example income verification system, according to some example embodiments.

FIG. 3 is a block diagram illustrating another example of an income verification system 128, according to some example embodiments. The income verification system 128 may include more than one income verification system as well as other supporting systems for income verification. For example, the income verification system 128 may include the income verification system 128 can include the income verification systems shown in FIG. 2, FIG. 3, FIG. 4, some combination of these income verification systems, or other/additional income verification systems and other supporting systems for income verification.

The income verification system 128 in FIG. 3 receives user data from a client device 110 (or third-party server or other computing system), as described above for FIG. 2. A canonicalization component 302 normalizes the user data to generate canonicalized user data 304, as described in further detail below. For example, user data may include different representations of the same employer, job title, and so forth. The user data may also have spelling errors. Thus, the user data is normalized to conform to a standard format. The following shows canonicalization examples:

| Input (user data) | Canonicalization Output |
| --- | --- |
| U.S.P.S., U.S. Postal Service | United States Postal Service |
| GE, G.E. | General Electric |
| Acc. Manager | Account Manager |
| Sr. Manager, Snr. Manager | Senior Manager |

In this example, transformation from the user data to the canonicalization output was performed using a lookup table comprising the most common examples found in the dataset.

A query generator 306 uses the canonicalized user data 304 to generate a search query to perform an internet search. In another example, the query generator may use the received user data without canonicalization to generate an internet search query. The search query may comprise multiple search queries. For example, a set of search queries are created, such as '<Employer> <Job Title>"salary,"' '<Job Title>"salary,"' and '<Industry> <Job Title>"salary."' In one example, query patterns are chosen to achieve maximum possible recall with a minimum number of queries.

A search engine 308 uses the generated search query to search the internet. In one example, the search engine 308 is part of the income verification system 128. In another example, the search engine 308 is an entity outside of the income verification system 128 (e.g., a third-party server or other computing system).

The search engine 308 generates search results 310. A data extractor 312 extracts salary information from the search results 310 to generate income records 314.

Likewise, a database query generator 318 uses the canonicalized user data 304 to generate a search query to perform a database search of salary records in one or more database(s) 126. In one example, the salary records stored in the one or more database(s) 126 are based on public salary data and/or private salary data, as explained above. In one example, the search query is a lookup based on the user's identity and canonicalized user data 304. The database query generator 318 generates database income records 322 based on the results of the database search of the one or more database(s) 126.

A record matcher 316 uses the combination of the database income records 322 and the (internet) income records 314 to generate candidate income records 320. In one example, identities are extracted from the income records 314 and a top predetermined number (e.g., five) of the best matches are chosen. The extraction system depends on the type of record. For instance, for records from structured sources the identities are extracted using XML, paths, in one example. For unstructured sources such as web snippets and text, regular expression patterns are used to extract the identities, in another example.

From the source identity and input identity, the record matcher 316 creates features such as a name string match score, address string match score, employer string match score, position string match score, and industry match score. In one example a machine learning model (not shown) is used to determine a match or similarity scores for these features. In one example, a sample of 1000 source identity and input identity pairs were used as a dataset and annotated with 0 indicating no match and 1 indicating a match to train the machine learning model for determining a match or similarity score for features. In one example, the machine learning model is a decision tree used to create the matching algorithm. Different thresholds are used to assign confidence scores to the matches. In one example, a match or similarity score of above 0.8 is a high match or high confidence score. The income records may then be ranked according to the match or similarity score, and a predetermined number of income records (e.g., the top five) may be selected for candidate income records feature extraction.

A feature extractor 324 extracts features from each candidate income record and inputs the extracted features into a machine learning model 326. For example, the feature extractor 324 extracts a base salary median, base salary low, base salary high, total compensation median, total compensation low, and total compensation high for each of these income records. In one example, the total compensation includes bonuses, stock awards, and profit sharing. In many cases only a subset of the salary attributes exists. The match or similarity score for each candidate record that are generated by the record matcher 316 may also be input into the machine learning model 326.

In one example, the employment positions are aggregated by industry to find the industry-wide ratio of each salary value to the other values. These industry-wide ratios may be stored in one or more databases 126. In one example, if there are missing values in candidate records, the missing values are filled by multiplying the known salary attribute with the industry-wide ratio (e.g., for the industry related to the position and/or employer in the candidate record). If none of the attributes exist, the income record is discarded.

The feature extractor 324 then generates features for each income record (e.g., income_max, income_median, income_min, etc.). In one example, each income record generates six features. Also, the similarity or match score is added to the feature set. In the example of using the top five income records, for each user there is a feature dimension of 35.

In one example, the machine learning model 326 is a gradient-boosted tree model, but it is to be understood that other machine learning models can be used (e.g., logistic regression, support vector machines, random forest, gradient boosting trees, etc.). The machine learning model 326 outputs an income prediction 328, as described above for the machine learning model 208 and result income prediction 210 in FIG. 2.

Figure 4:
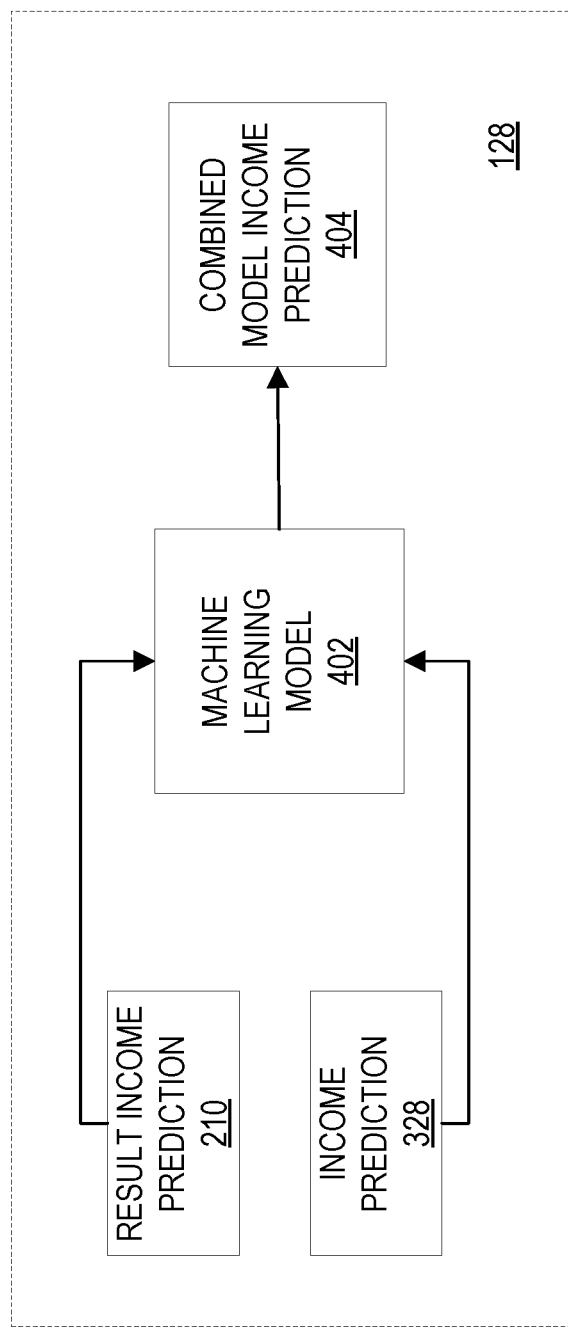
FIG. 4 is a block diagram illustrating yet another example income verification system, according to some example embodiments.

In one example, the features described with respect to FIG. 3 are stacked with the income prediction from the machine learning model 208 of FIG. 2 and passed to a third machine learning model 402, as shown in FIG. 4. In one example, the machine learning model 402 in FIG. 4 is a gradient-boosted decision tree, but other models may be used in other example embodiments. In the example in FIG. 4, the result income prediction 210 and the income prediction 328 are input into the machine learning model 402. The machine learning model 402 outputs a combined model income prediction 404. The combined model income prediction 404 is a positive number (e.g., 40,000, or 150,000), as explained above with respect to the result income prediction 210 and income prediction 328.

Figure 5:
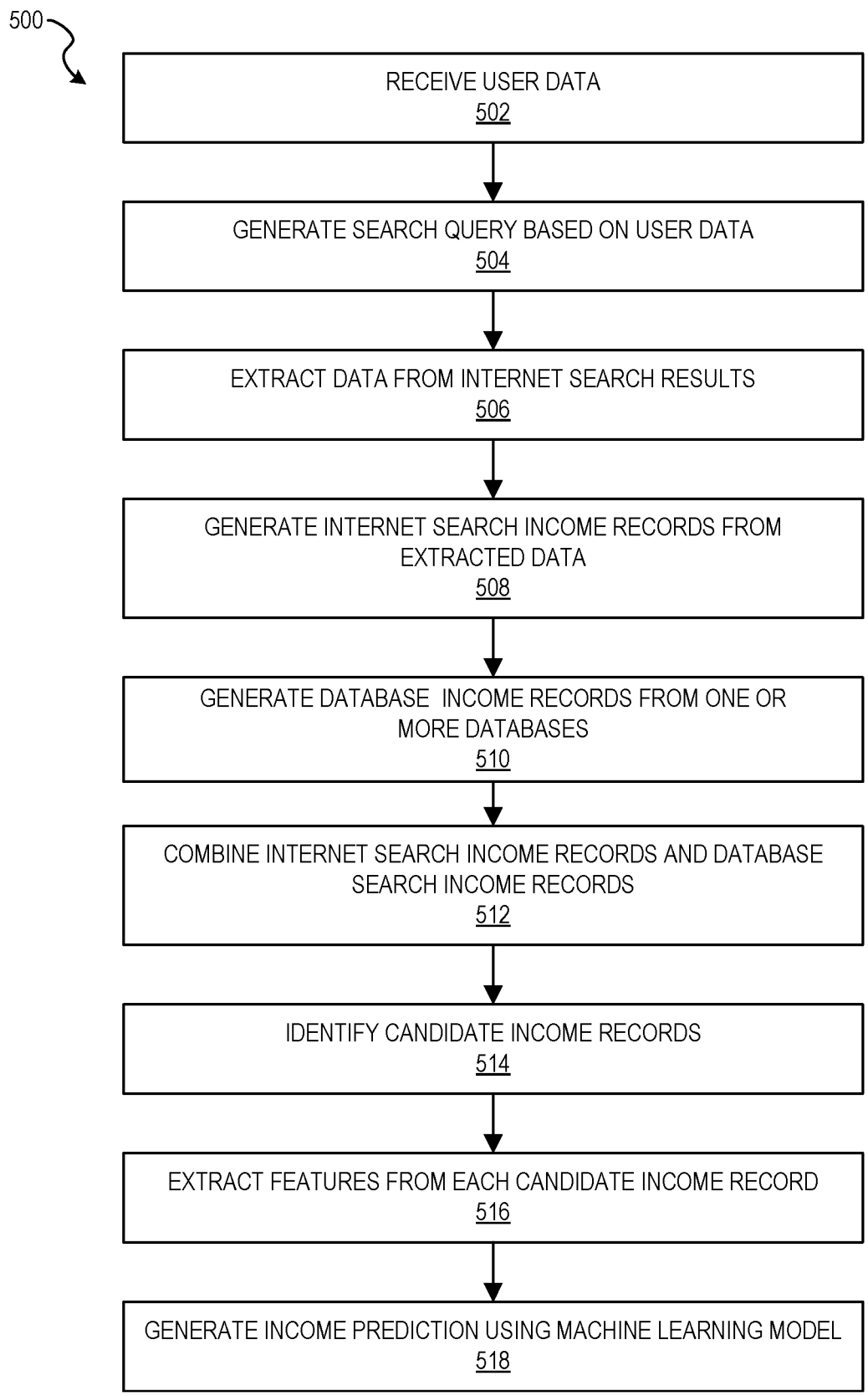
FIG. 5 is a flow chart illustrating aspects of a method, for generating an income prediction, according to some example embodiments.

FIG. 5 is a flow chart illustrating aspects of a method 500, for generating an income prediction, according to some example embodiments. For illustrative purposes, the method 500 is described with respect to the networked system 100 of FIG. 1 and the income verification system 128 of FIG. 3. It is to be understood that the method 500 may be practiced with other system configurations in other embodiments.

In operation 502, a computing system (e.g., the server system 102, income verification system 128, etc.) receives user data. In one example, the user data comprises a user name, a user employer, a user position, and a user salary. In other examples, the user data comprises additional or different data, as explained above.

In one example, the user enters user data via a client device and the client device sends the user data to the computing system. In another example, the user data is sent via a third-party server or other computing system.

In one example embodiment, the computing system canonicalizes the user data. For example, the computing system normalizes the user data to conform to a standard format for the user name, the user employer, the user position, and the user salary. As explained above, user data may be entered in a variety of formats. For example, a software engineer position may be entered as "software engineer," "software development engineer," "SE," "SDE," "software engineer 2," and so forth. Similarly, an employer name may be entered as "GE," "G.E.," or "General Electric." Accordingly, example embodiments use one or more technologies or data sources to normalize the user data, such as string matching algorithms (e.g., Jaccard), spell check algorithms, transduction, transformation, a dictionary of equivalencies, and the like.

In one example embodiment, the computing system determines an industry type for the position to aid with understanding abbreviations or alternate forms of company names and positions. For example, the computing system may store data on various positions and employers and associate them with various industries. Some example industries include medical, farming, mining, construction, manufacturing, food processing, hardware, airlines, transportation, logistics, telecom, utilities, wholesale, retail, restaurants, finance, insurance, real estate, hospitality, business, engineering, healthcare, software, education, entertainment, and so forth. The computing system uses the industry type to determine abbreviations and alternate spellings for terms and employers in a specific industry. For example, the medical industry uses different terms than the farming industry. The industry type may also be used to determine salary ranges for a position, fill in missing information for a position, and so forth.

In operation 504, the computing system generates a search query based on the user data to perform an internet search using the search query. In one example, the search query comprises multiple search queries (either combined or separate), as explained above. For example, a set of search queries are created, such as '<Employer> <Job Title>"salary,"' '<Job Title>"salary,"' and '<Industry> <Job Title>"salary."' Query patterns are chosen to achieve maximum possible recall with a minimum number of queries. The computing system performs a search of the internet (e.g., public web) using the search query to generate search results. In one example, the computing system utilizes a search engine such as Bing to perform the search.

The search query may return thousands or more of search results. In one example, the computing system selects a subset of the search results, such as a first predetermined number (e.g., 50) of search results, to use for extracting data and generating internet search income records.

In operation 506, the computing system extracts data from the search results (or a subset of the search results) from the internet search. For example, the search results may comprise a number of documents (e.g., articles, company openings of positions, reports, etc.) that may be in structured or unstructured formats. The computing system extracts data relevant to the user data (e.g., position information, employer information, and salary information) from each document. As explained above, the extraction system depends on the type of document. For instance, for documents from structured sources such as FedsDataCenter and Payscale, the data is extracted using XML paths, in one example. For unstructured sources such as web snippets and text, regular expression patterns or natural language processing techniques are used to extract the data, in another example. Different rules for the extraction system may be created based on a structure of a source, lack of structure of a source, a particular source, and so forth.

In operation 508, the computing system generates internet search income records from the extracted data. In one example, each of the internet search income records comprises data including employer, position, location, and median salary, but it is to be understood that income records may comprise additional or different information. Also, some fields may be missing or incomplete based on the data that is available to be extracted from each document. In one example, data in the internet search income records is canonicalized to normalize the internet search income records to conform to a standard format, as explained above.

In operation 510, the computing system generates database income records (also referred to as database search income records) from one or more databases comprising income records, based on the user data. For example, the computing system generates a query for one or more databases or datastores (e.g., the database(s) 126) based on the user data, in a way similar to that described above for generating a query for an internet search. The format for the query may be different for a database or datastore search than an internet search. The computing system receives the search results, retrieves the data from the one or more databases, and then generates database income records from the data, as shown in operation 510. In one example, generating the database income records may further comprise canonicalization to normalize the database income records to conform to a standard format, as explained above.

In operation 512, the computing system combines the internet search income records and the database income records to form combined income record results. In operation 514, the computing system identifies candidate income records from the combined income record results to be used for income prediction. For example, the computing system compares each income record of the combined income record results to the user data (or the normalized/canonicalized user data) to determine a similarity score for each income record of the combined income record results. For example, the computing system compares each attribute (e.g., employer name, position name, salary) of the normalized user data with each of the same attribute of each income record. Example embodiments may use a known string matching or similar technology (e.g., term frequency-inverse document frequency (TF-IDF)) to generate a similarity score for each attribute of each income record. A machine learning model, such as a decision tree, uses the attribute similarity scores to generate an overall similarity score for each income record, as explained above. In one example, the similarity score is a number between 0 and 1 indicating how similar the income record is to the normalized user data.

In one example, the computing system selects a predetermined number of income records as candidate income records for generating the income prediction, based on the similarity score for each income record. For example, the computing system may rank the income records by similarity score, take the top predetermined number (e.g., five, ten, etc.), and use those top income records for income prediction. In another example, the computing system may use all the income records above a predetermined threshold similarity score (e.g., 0.7, 0.8, 0.9) as the candidate income records to be used for income prediction. In another example, any income records with a similarity score below a predetermined threshold (e.g., 0.6, 0.5) are discarded.

In operation 516, the computing system extracts features from each candidate income record for generating an income prediction. In one example, the computing system extracts a salary range from each candidate income record to generate a minimum salary amount, a median salary amount, and a maximum salary amount from the salary range. The salary range may be based on a variable income factor based on a profession type (e.g., sales professionals may have a lower base salary but higher bonuses). For example, if the salary range of the candidate income record is $30,000 to $60,000, the computing system would generate the minimum salary value as $30,000, a median salary of $45,000, and a maximum salary of $60,000. In some cases, sources may also provide total compensation ranges, which may include factors such as bonus, tips, and so forth. So there may be a number of features extracted from candidate income records, such as similarity or match score, minimum salary, median salary, maximum salary, minimum total compensation, median total compensation, maximum total compensations, and the like, which are fed into the machine learning model.

In operation 518, the computing system generates an income prediction using a machine learning model (e.g., the machine learning model 326) to predict an income, based on the extracted features from the candidate income records. As explained above, the income prediction is a positive number indicating the salary (e.g., 40,000 or 150,000). The income prediction can then be used to verify the accuracy of the user input income.

In one example, an income is determined to be verified (e.g., accurate) if a ratio of the income prediction is above a predetermined threshold (e.g., 0.9), as explained above. The predetermined threshold may vary depending on how accurate the requestor needs the verification to be. For example, a lender of a large amount of money may have a higher threshold in verifying income than a lender of a small amount of money, or than another entity using income verification for other use cases where it just needs to know whether or not the user income is in a general range of income.

In another example, a range of verification may be determined using the income prediction. For example, a low confidence range includes an income prediction below a predetermined value (e.g., 0.6) and indicates that the user input salary is not likely accurate, a medium confidence range includes an income prediction between a predetermined range of values (e.g., 0.6 and 0.9) and indicates that the user input salary is likely within a spread for the salary, and a high confidence range may include an income prediction of 0.9 or higher, indicating that the user input salary is fairly accurate. In this way a requestor can determine whether or not the income is verified for the entity's particular situation.

In one example, the income prediction is provided to one or more computing devices or systems. The one or more computing devices or systems may use the income prediction to make decisions such as whether or not to provide approval for a loan for the user or to adjust an interest rate on a loan. Example embodiments provide income predictions in real time (or near-real time) so that systems utilizing the income predictions can make decisions and approve users in real time (or near-real time).

Example embodiments may be extended in various ways. For example, example embodiments may explore income verification when only identify information is available (e.g., name and address) but no employment information is provided, or when there is only partial employment information available (e.g., title and industry, but no employer name). Moreover, example embodiments can be internationalized to account for different salary ranges, positions, employers, and so forth, in various countries.

Moreover, example embodiments may be used to analyze trends for salaries over one or more years. This can be used to determine a user earning potential, in one example.

Figure 6:
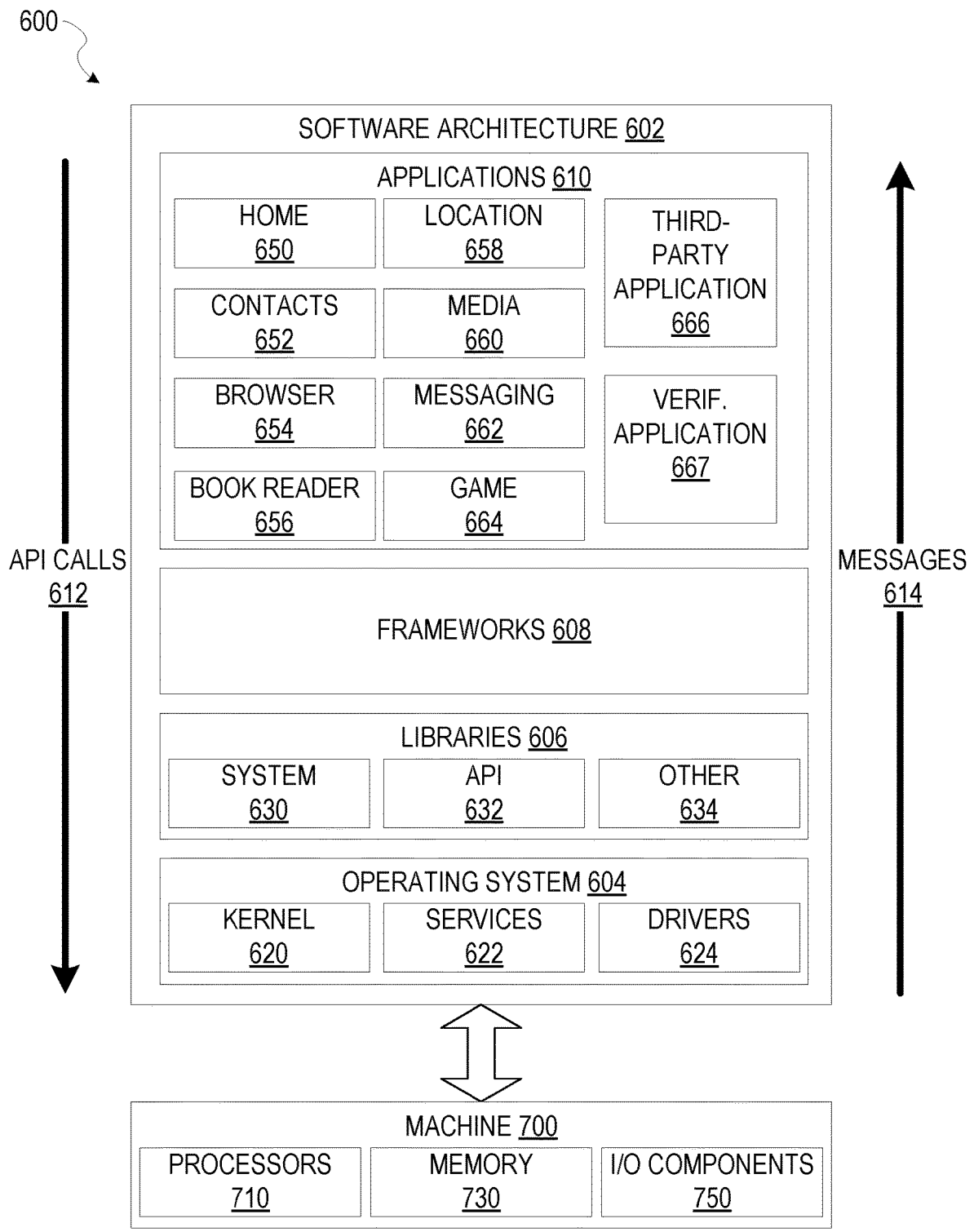
FIG. 6 is a block diagram illustrating an example of a software architecture that may be installed on a machine, according to some example embodiments.

FIG. 6 is a block diagram 600 illustrating a software architecture 602, which can be installed on any one or more of the devices described above. For example, in various embodiments, client devices 110 and server systems 130, 102, 120, 122, and 128 may be implemented using some or all of the elements of the software architecture 602. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render two-dimensional (2D) and three-dimensional (3D) graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as a third-party applications 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Some embodiments may particularly include a verification application 667, which may be any application that requests data or other tasks to be performed by systems and servers described herein, such as the server system 102, third-party servers 130, and so forth. In certain embodiments, this may be a standalone application that operates to manage communications with a server system such as the third-party servers 130 or server system 102. In other embodiments, this functionality may be integrated with another application. The verification application 667 may request and display various data related to income verification and may provide the capability for a user 106 to input data related to the system via voice, via a touch interface, via a keyboard, or using a camera device of the machine 700; communication with a server system via the I/O components 750; and receipt and storage of object data in the memory 730. Presentation of information and user inputs associated with the information may be managed by the verification application 667 using different frameworks 608, library 606 elements, or operating system 604 elements operating on the machine 700.

Figure 7:
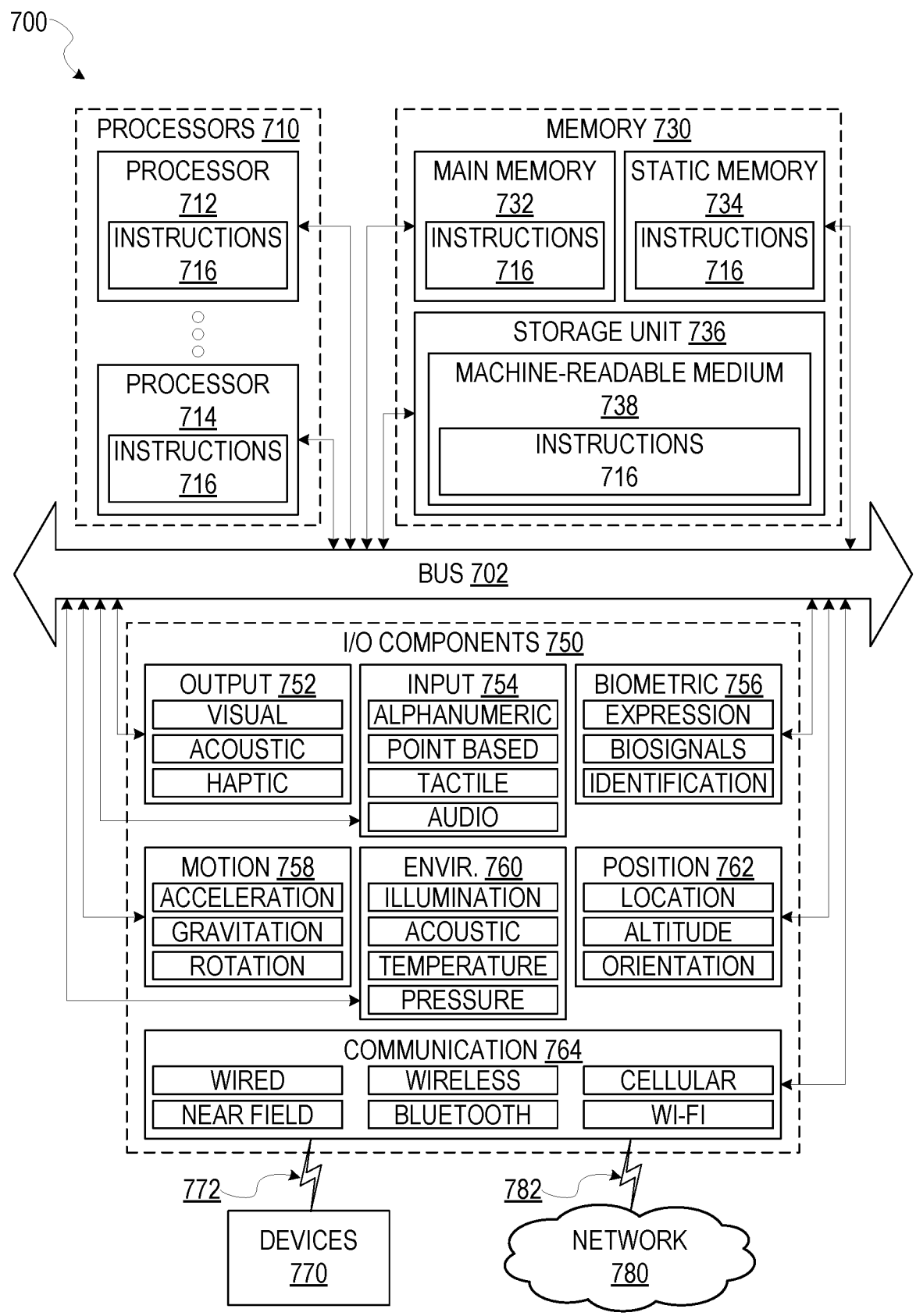
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine 130, 102, 120, 122, 124, 128 and the like, or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiple cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, the communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the medium 738 should be considered as being transportable from one physical location to another. Additionally, since the machine-readable medium 738 is tangible, the medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
    receiving, by a computing system, user data for a first user, the user data comprising a user name, a user employer, a user position, a user salary, and a user state;
    generating, by the computing system, a search query based on the user data to perform an internet search using the search query;
    selecting a predetermined number of search results as a subset of internet search results;
    extracting data from the subset of internet search results from the internet search using the search query, the extracted data comprising data associated with the user data for the first user;
    generating internet search income records from the extracted data;
    generating, based on the user data, income records for the first user from one or more databases comprising income records;
    combining the internet search income records based on the user data for the first user and the generated income records for the first user from the one or more databases, to form combined income record results;
    generating a similarity score for each combined income record result indicating a strength of similarity of each combined income record result to the user data;
    identifying candidate income records from the combined income record results by performing operations comprising:
        ranking the combined income records by similarity score; and
        selecting a predetermined number of the top ranked combined income records for the candidate income records;
    extracting features from each candidate income record for generating a first income prediction, the extracted features comprising at least one of a base salary median, a base salary low, a base salary high, a total compensation median, a total compensation low, and a total compensation high for each candidate income record;
    inputting, into a first machine learning model to predict an income for the first user, the extracted features from the candidate income records and the similarity score for each candidate income record, to generate the first income prediction for the first user;
    calculating an accuracy value of the first income prediction indicating how likely the user salary received in the user data is accurate;
    validating the user salary received in the user data based on determining that the accuracy value is above a predetermined threshold;
    generating a multi-dimensional position vector from the user position of the user data by inputting the user position of the user data into a position vector generator trained using a plurality of distinct positions obtained from public data and using word embedding;
    generating a multi-dimensional employer vector from the user employer of the user data by inputting the user employer of the user data into an employer vector generator trained using a plurality of distinct employers obtained from public data and using word embedding;
    generating a multi-dimensional state vector from the user state of the user data;
    inputting the multi-dimensional position vector, the multi-dimensional employer vector, and the multi-dimensional state vector into a second machine learning model for predicting an income, to generate a second income prediction; and
    inputting the first income prediction of the first machine learning model and the second income prediction of the second machine learning model into a third machine learning model, generating a combined income prediction using the first income prediction and the second income prediction.

2. The method of claim 1, where after receiving the user data, the method further comprises:
    normalizing the user data to conform to a standard format for the user name, the user employer, the user position, and the user salary.

3. The method of claim 1, further comprising:
    discarding any income records of the combined income record results with a similarity score below a predetermined threshold.

4. The method of claim 1, wherein the extracted features further comprise the similarity score and a salary range for each candidate income record.

5. The method of claim 4, wherein the salary range includes a minimum salary amount, a median salary amount, and a maximum salary amount.

6. The method of claim 1, wherein generating the internet search income records from the extracted data further comprises normalizing the internet search income records to conform to a standard format.

7. The method of claim 1, wherein generating, based on the user data, the income records from the one or more databases comprising income records comprises:
  generating a second search query based on the user data; and
  generating the income records from the one or more databases from results of the second search query.

8. The method of claim 7, wherein generating the income records from the one or more databases from the results of the second search query further comprises normalizing the income records from the one or more databases to conform to a standard format.

9. A system comprising:
  a memory that stores instructions; and
  one or more processors configured by the instructions to perform operations comprising:
  receiving user data for a first user, the user data comprising a user name, a user employer, a user position, a user salary, and a user state;
  generating a search query based on the user data to perform an internet search using the search query;
  selecting a predetermined number of search results as a subset of internet search results;
  extracting data from the subset of internet search results from the internet search using the search query, the extracted data comprising data associated with the user data for the first user;
  generating internet search income records from the extracted data;
  generating, based on the user data, income records for the first user from one or more databases comprising income records;
  combining the internet search income records based on the user data for the first user and the generated income records for the first user from the one or more databases, to form combined income record results;
  generating a similarity score for each combined income record result indicating a strength of similarity of each combined income record result to the user data;
  identifying candidate income records from the combined income record results by performing operations comprising:
    ranking the combined income records by similarity score; and
    selecting a predetermined number of the top ranked combined income records for the candidate income records;
  extracting features from each candidate income record for generating a first income prediction, the extracted features comprising at least one of a base salary median, a base salary low, a base salary high, a total compensation median, a total compensation low, and a total compensation high for each candidate income record;
  inputting, into a first machine learning model to predict an income for the first user, the extracted features from the candidate income records and the similarity score for each candidate income record, to generate the first income prediction for the first user;
  calculating an accuracy value of the first income prediction indicating how likely the user salary received in the user data is accurate;
  validating the user salary received in the user data based on determining that the accuracy value is above a predetermined threshold;
  generating a multi-dimensional position vector from the user position of the user data by inputting the user position of the user data into a position vector generator trained using a plurality of distinct positions obtained from public data and using word embedding;
  generating a multi-dimensional employer vector from the user employer of the user data by inputting the user employer of the user data into an employer vector generator trained using a plurality of distinct employers obtained from public data and using word embedding;
  generating a multi-dimensional state vector from the user state of the user data;
  inputting the multi-dimensional position vector, the multi-dimensional employer vector, and the multi-dimensional state vector into a second machine learning model for predicting an income, to generate a second income prediction; and
  inputting the first income prediction of the first machine learning model and the second income prediction of the second machine learning model into a third machine learning model, generating a combined income prediction using the first income prediction and the second income prediction.

10. The system of claim 9, wherein the extracted features further comprise the similarity score and a salary range for each candidate income record.

11. The system of claim 10, wherein the salary range includes a minimum salary amount, a median salary amount, and a maximum salary amount.

12. The system of claim 9, wherein generating the internet search income records from the extracted data further comprises normalizing the internet search income records to conform to a standard format.

13. The system of claim 9, wherein generating, based on the user data, the income records from the one or more databases comprising income records comprises:
  generating a second search query based on the user data; and
  generating the income records from the one or more databases from results of the second search query.

14. The system of claim 13, wherein generating the income records from the one or more databases from the results of the second search query further comprises normalizing the income records from the one or more databases to conform to a standard format.

15. A non-transitory computer-readable medium comprising instructions stored thereon that are executable by at least one processor to cause a computing device associated with a first data owner to perform operations comprising:
  receiving user data for a first user, the user data comprising a user name, a user employer, a user position, a user salary, and a user state;
  generating a search query based on the user data to perform an internet search using the search query;
  selecting a predetermined number of search results as a subset of internet search results;

extracting data from the subset of internet search results from the internet search using the search query, the extracted data comprising data associated with the user data for the first user;
generating internet search income records from the extracted data;
generating, based on the user data, income records for the first user from one or more databases comprising income records;
combining the internet search income records based on the user data for the first user and the generated income records for the first user from the one or more databases, to form combined income record results;
generating a similarity score for each combined income record result indicating a strength of similarity of each combined income record result to the user data;
identifying candidate income records from the combined income record results by performing operations comprising:
    ranking the combined income records by similarity score; and
    selecting a predetermined number of the top ranked combined income records for the candidate income records;
extracting features from each candidate income record for generating a first income prediction, the extracted features comprising at least one of a base salary median, a base salary low, a base salary high, a total compensation median, a total compensation low, and a total compensation high for each candidate income record;
inputting, into a first machine learning model to predict an income for the first user, the extracted features from the candidate income records and the similarity score for each candidate income record, to generate the first income prediction for the first user;
calculating an accuracy value of the first income prediction indicating how likely the user salary received in the user data is accurate;
validating the user salary received in the user data based on determining that the accuracy value is above a predetermined threshold;
generating a multi-dimensional position vector from the user position of the user data by inputting the user position of the user data into a position vector generator trained using a plurality of distinct positions obtained from public data and using word embedding;
generating a multi-dimensional employer vector from the user employer of the user data by inputting the user employer of the user data into an employer vector generator trained using a plurality of distinct employers obtained from public data and using word embedding;
generating a multi-dimensional state vector from the user state of the user data;
inputting the multi-dimensional position vector, the multi-dimensional employer vector, and the multi-dimensional state vector into a second machine learning model for predicting an income, to generate a second income prediction; and
inputting the first income prediction of the first machine learning model and the second income prediction of the second machine learning model into a third machine learning model, generating a combined income prediction using the first income prediction and the second income prediction.

16. The method of claim 1, wherein selecting a predetermined number of top ranked combined income records for the candidate income records further comprises selecting the candidate income records with a similarity score above a predetermined threshold similarity score as the top ranked combined income records for the candidate income records.

17. The method of claim 1, wherein generating the similarity score for each combined income record result indicating a strength of similarity of each combined income record result to the user data comprises:
    generating a similarity score for a name and a similarity score for a position indicated in each combined income record; and
    wherein the similarity score for each combined income record result is generated using the similarity score for the name and similarity score for the position indicated in the combined income record.

* * * * *